Figure 1:
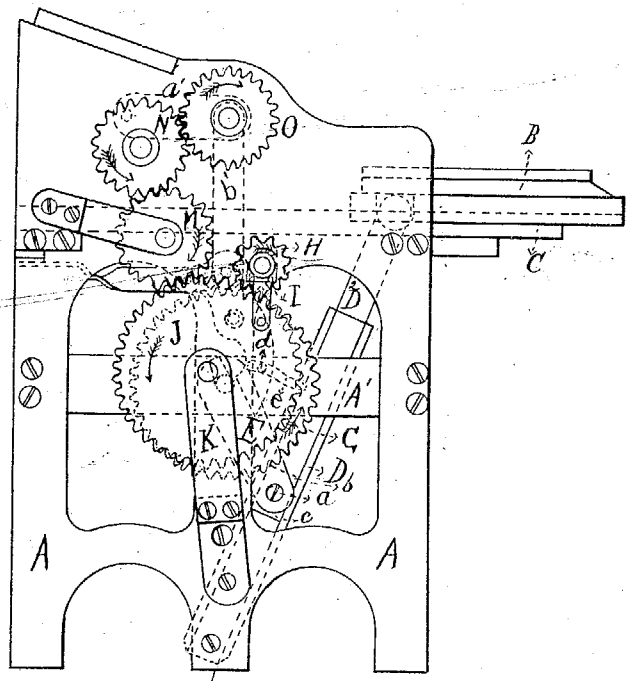
Figure 4:
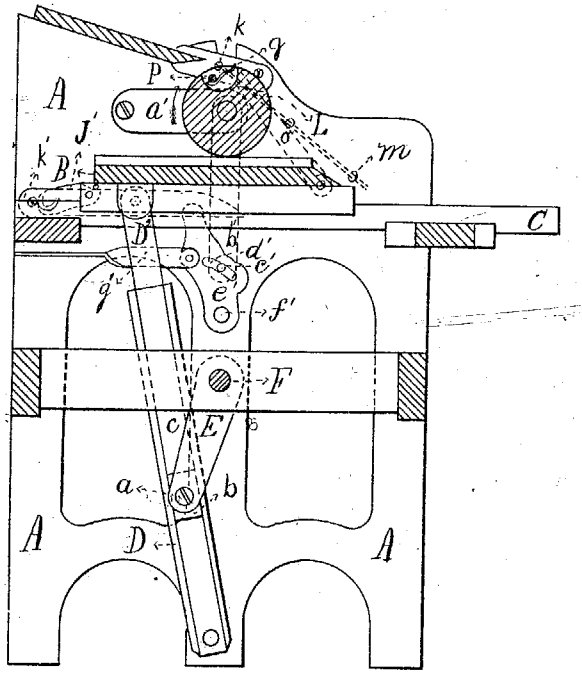
Figure 2:
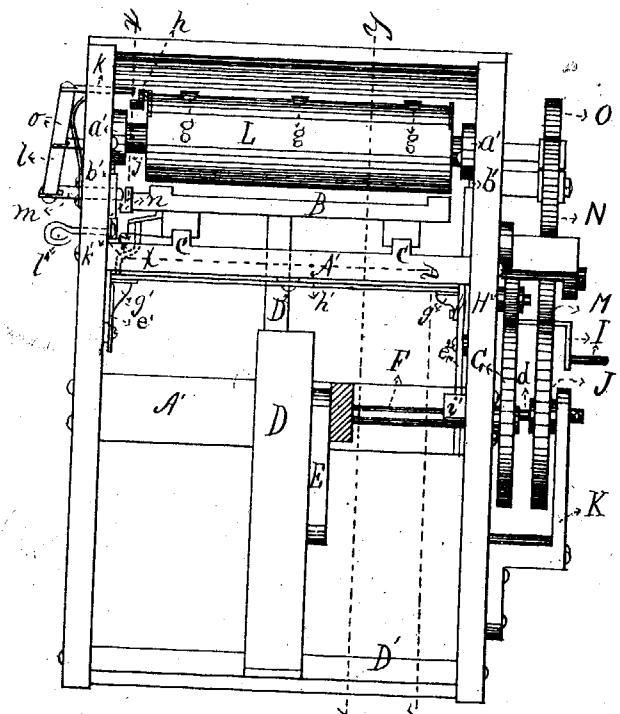
Figure 3:
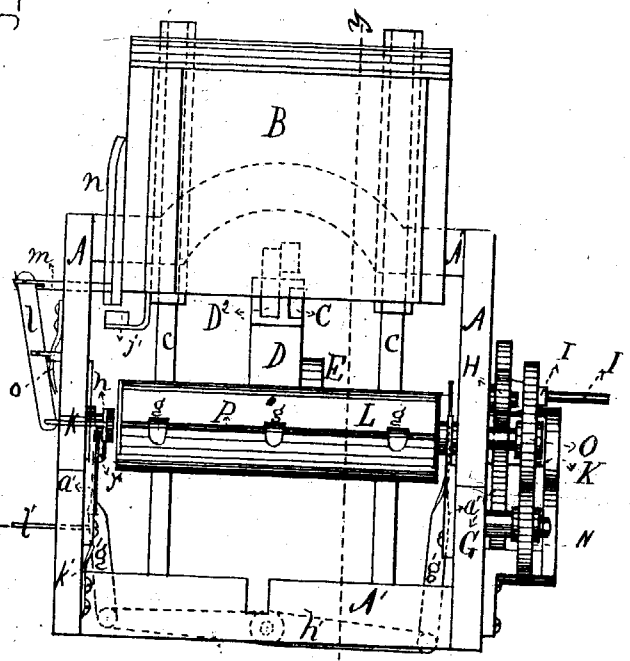
Figure 5:
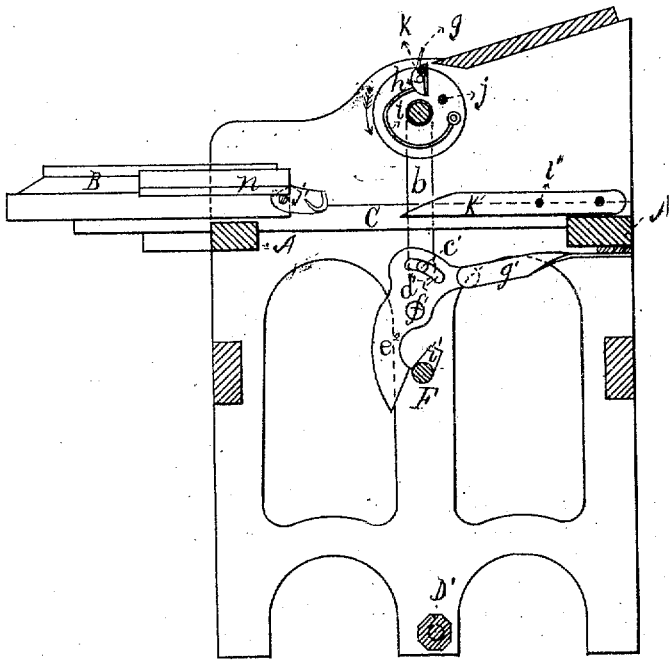

3 Sheets--Sheet 1.

C. MONTAGUE.

Rotary Printing-Presses.

No. 5,501. Reissued July 22, 1873.

WITNESSES

Frank A. Dunbar.

Frank D. Withnell.

INVENTOR

Charles Montague

3 Sheets--Sheet 2.

C. MONTAGUE.

Rotary Printing-Presses.

No. 5,501.

Reissued July 22, 1873.

WITNESSES

Frank A. Dunbar.

Frank D. Withrell.

INVENTOR

Chas. Montague

3 Sheets--Sheet 3.

C. MONTAGUE.

Rotary Printing-Presses.

No. 5,501. Reissued July 22, 1873.

WITNESSES

Frank A. Dunbar

Frank D. Witherell

INVENTOR

Charles Montague

UNITED STATES PATENT OFFICE.

CHARLES MONTAGUE, OF BOSTON, MASSACHUSETTS, ASSIGNOR TO CYRIL C. CHILD, OF SAME PLACE.

IMPROVEMENT IN ROTARY PRINTING-PRESSES.

Specification forming part of Letters Patent No. 98,088, dated December 21, 1869; reissue No. 5,501, dated July 22, 1873; application filed March 21, 1873.

*To all whom it may concern:*

Be it known that I, CHARLES MONTAGUE, of Boston, in the county of Suffolk and State of Massachusetts, have invented certain new and useful Improvements in Printing-Presses; and I do hereby declare the following to be a full, clear, and exact description of the same, taken in connection with the accompanying drawings making a part of this specification and the letters of reference marked thereon, in which—

Figure I is a side elevation of my improved press. Fig. II is an end elevation with back girt removed, and showing the longitudinal girt which forms the inner bearing of the crank-shaft in section. Fig. III is a plan with feed-table removed. Fig. IV is a vertical section on line *y y* on Fig. II. Fig. V is a section on a crooked line, the upper portion being cut on line *x x*, and the lower portion on line *v v* on Fig. II.

My invention relates, in the first place, to the mode of operating the type-bed and impression-cylinder; and consists in a combination of instrumentalities or organisms, the constituent parts of which are, first, a vibrating lever for moving the type-bed, constructed in two parts, one of which slides in and out of the other in a telescopic manner, the upper end of said lever being attached to the under side of the bed. The second organism consists of a gear-wheel hung upon a stud outside of the end of the crank-shaft, and so hung that its axis shall be eccentric to the axis of said shaft, and carrying a crank-pin permanently attached thereto, which projects inwardly and fits into a slot cut in the main gear on the end of the crank-shaft, as represented in the drawings, and will be more fully described hereafter. My invention relates, in the second place, to the mechanism employed to raise and lower the impression-cylinder, for the purpose of relieving the cylinder from contact with the bed during its backward movement, and the device for arresting the operation of the mechanism which lowers the cylinder, at the will of the operator, for the purpose of preventing an impression during the forward movement of the bed, which is more fully explained hereafter. My invention relates, in the third place, to the combination of the several parts which operate to give motion to the nipper or griper rod at the proper time in the revolution of the cylinder, which mechanism will be more fully explained hereafter.

In the drawings, A represents the side frames of the machine, connected together by the tie-girts A′. B is the type-bed, fitted to move on slides C, and moved by the lever D made in two parts, the lower portion being attached to the rocker-shaft $D^1$, and the upper portion $D^2$ being fitted to suitable bearings in the lower portion, so that it may move out of or into the lower portion D, and so that as its upper end, being attached to the under side of the bed, moves in a straight line when said lever is moved by the action of the crank E, and its pin *a* in the block *b* working in the slot *c*, the length of the whole lever will constantly vary, according to the position of the bed. F is the main crank-shaft, and G is a gear-wheel made fast to the outer end of said shaft and driven by the pinion H and hand-crank I; or a pulley may be substituted for the crank I and the machine be driven by steam or water power. J is a gear-wheel fitted to revolve on a stud set in the stand K in such a manner that the axis of the gear-wheel J shall be eccentric to the axis of the crank-shaft F. The gear-wheel J is provided with a crank-pin, *d*, projecting inwardly, and fitting into the slot *e* cut in the gear-wheel G, and shown in dotted lines in Fig. I. The length of the slot *e* must be equal to double the distance between the center of the gear-wheel J and the center of the shaft F added to the diameter of the pin *d*, and be of the necessary form to give the required variableness to the rotation of the gear-wheel J, to give the requisite motion to the cylinder L to insure its moving in exact unison with the type-bed during the whole time of taking an impression. M, N, and O are gear-wheels, through which the motion of the gear-wheel J is transmitted to the cylinder L, and are so arranged that the cylinder L may be raised or lowered without affecting the operation of the gears. $a'$ $a'$ are radial arms, pivoted to the frame in a horizontal position, in the movable end of which are formed the bearings for the cylinder L. $b'$ $b'$ are bars or rods, fitted to slide in bearings on the frame, and attached, by their upper ends, to the movable ends of the radial arms $a'$, and carrying pins $c'$ $c'$ at their lower ends, which fit into cam-slots $d'$ $d'$ formed in the vibrating levers $e^1$ and $e^2$, attached to the frame by fulcrum-pins $f'$. $g'$ $g'$ are two links, and $h'$ a lever, which serve to connect the levers $e^1$ and $e^2$ together, so that any motion of one of said levers will be transmitted to the other. $i'$ is a cam on the main crank-shaft, which, acting upon the lower end of the lever $e^2$, raises the cylinder. $j'$ is a dog, pivoted to one edge of the bed in such a position that when the bed moves from front to rear it will strike the upper end of the lever $e^1$, and moving it till the pin $c'$ is in the lowest portion of the slot $d'$, when the cylinder will be in the proper position to give impression to the sheet. $k'$ is a spring, wedge, or cam, which is used to throw the dog $j'$ out of gear, or prevent its action when it is desired to prevent a sheet from being printed, and $l'$ is a handle, by which it is operated. P is a rocker-shaft, to which the nippers $g$ $g$ are attached, and $h$ is an arm, made fast to one end of said shaft, by which it is rotated; and $i$ is a spring, attached, by one end, to the end of the cylinder, while the other end is made fast to the arm $h$, and serves the purpose of holding the nippers with considerable tension upon them, whether they are closed or open. $j$ is a pin fixed in the frame, which serves the purpose of opening the nippers by the striking of the arm $h$ against it during the revolution of the cylinder, said cylinder rotating in the direction indicated by the arrow. $k$ is a pin, so placed that the striking of the arm $h$ against it will cause the rocker-shaft P to be revolved in the opposite direction, and close the nippers onto the sheet. The pin $k$ is fitted to slide in a bearing in the frame, and is attached to the upper end of the lever $l$, hung by its center to a stand on the outside of the frame, the lower end of said lever having another slide-rod, $m$, attached thereto, and extending through the frame in such a position that it may be acted upon by the cam or wedge surface $n$ on the edge of the bed, and move the pin $k$ into such a position that it will be struck by the arm $h$, and close the nippers. $o$ is a spring, which serves to throw the pin $k$ back out of the path of the arm $h$ when the cam-surface $n$ has moved away from the slide $m$, and holds it there till the bed returns again and the cam-surface $n$ comes in contact with the pin $m$.

The operation of my improved press is as follows: The sheets being placed upon the feed-table and fed down to the nippers in the usual manner, and the machine being set in motion by revolving the crank I, the bed carrying the type-form will be moved from the rear of the machine to the front, and passing under the inking-rollers (not shown in the drawings) while the crank F is moving through about one-third of its revolution, and that being the lower portion, and at about the time that the bed has arrived at the end of its movement in that direction, and while the cam-surface $n$ is holding the pin $m$ pushed out, and thereby holding the pin $k$ in the proper position, the cylinder, by its revolution, will cause the arm $h$ to strike the pin $k$ and cause the rocker-shaft P to be partially revolved, and close the nippers onto the sheet and carry it around with the cylinder at the same time the bed commences its return movement, and the dog, coming in contact with the upper end of the lever $e^1$, moves it, and, by the action of the cam-slots $d'$ $d'$, lowers the cylinder onto the form. Just at this point the motion of the bed and the impression-cylinder is made to correspond, and continues so to do until the impression is completed, this correspondence being effected by means of the two gears G and J set eccentrically and connected by the pin $d$ and slot $e$, in combination with the extensible vibrating lever D $D^2$. The motion of the machine being continued, the sheet will be carried around by the cylinder until the forward edge of the sheet has arrived at the proper point to be discharged, when the arm $h$ on the nipper-shaft P comes in contact with the pin $j$ and opens the nippers, and the sheet is taken off by means of tapes, (not shown in the drawings,) in the usual manner.

Before the bed returns to the front the cam $i$ comes in contact with the lower end of lever $e^2$, and, by the action of the slots $d'$ $d'$ upon the pins $c'$ $c'$, raises the cylinder, so that the bed and form may pass under the cylinder without receiving any impression, and as the bed moves back the dog passes over the lever $e^1$ without having any effect upon it.

If the operator wishes to prevent the next sheet from being printed, he will press upon the handle $l'$, which will spring the wedge $k'$ into the path of the dog $j'$, and said dog will be raised up and will pass over the lever $e^1$ without moving it, so that the bed will pass under the cylinder while it is in a raised position.

Having thus fully described the construction and operation of my improved press, what I claim as new, and desire to secure by Letters Patent, is—

1. The combination of suitable mechanism, substantially as described, for imparting motion to an impression-cylinder with the extensible vibrating lever D $D^2$ and a reciprocating type-bed, B, substantially as set forth.

2. The combination of the cam-levers $e^1$ and $e^2$, dog $j$, bed B, and cylinder L, constructed and operating substantially as described, for the purpose specified.

3. The spring-wedge $k'$ for arresting the action of the dog $j'$, constructed and operating substantially as described, for the purpose specified.

4. In combination with a reciprocating type-bed, the cam-wedge $n$, pins $m$ and $k$, lever $l$, spring $o$, and arm or dog $h$, constructed and operating substantially as described, for the purpose specified.

Executed at Boston this 19th day of March, 1873.

CHARLES MONTAGUE.

Witnesses:
C. W. L. MONTAGUE,
FRANK A. DUNBAR.